United States Patent

[11] 3,605,058

| [72] | Inventor | Frank Reingruber |
| | | 60 Main St., Bartlett, N.H. 03812 |
| [21] | Appl. No. | 31,985 |
| [22] | Filed | Apr. 27, 1970 |
| [45] | Patented | Sept. 14, 1971 |

[54] ULTRA SENSITIVE THERMOSTATIC SWITCH
5 Claims, 3 Drawing Figs.

[52] U.S. Cl. .................................................... 337/386, 337/388
[51] Int. Cl. ...................................................... H01h 37/04, H01h 37/48
[50] Field of Search .......................................... 200/166 M; 337/382, 384, 386, 388, 392, 394, 398

[56] References Cited
UNITED STATES PATENTS

| 3,098,140 | 7/1963 | Reingruber | 337/386 UX |
| 2,549,054 | 4/1951 | Burling | 337/384 |
| 2,498,988 | 2/1950 | Eden et al. | 337/398 X |
| 2,420,352 | 5/1947 | Burling | 337/388 |

*Primary Examiner*—Bernard A. Gilheany
*Assistant Examiner*—Dewitt M. Morgan
*Attorney*—Pearson & Pearson ABSTRACT: A thermostatic switch of the elongated probe, pivoted microswitch, pivoted switch arm type uses only a single probe to double the travel of the switch button away from the arm. For each degree change of temperature sensed by the probe, the switch contacts are moved double the conventional distance, thereby increasing the sensitivity of the switch.

PATENTED SEP 14 1971
3,605,058
FIG. 1 FIG. 2
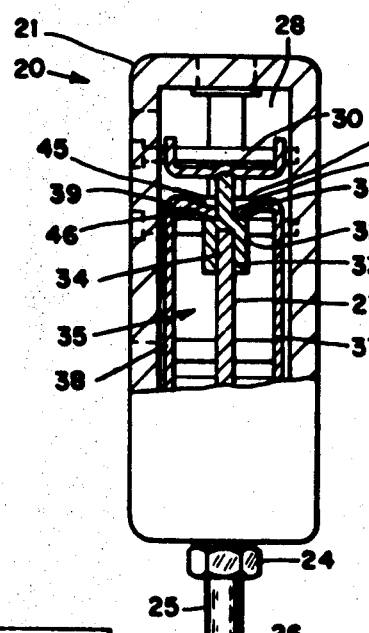
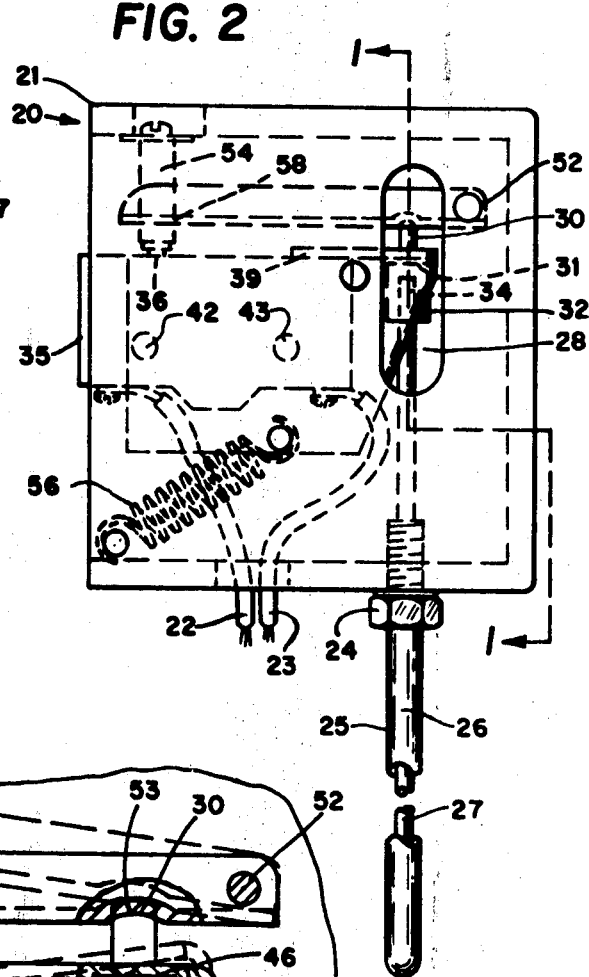
FIG. 3
INVENTOR
FRANK REINGRUBER
BY
Pearson + Pearson
ATTORNEYS

ULTRA SENSITIVE THERMOSTATIC SWITCH

BACKGROUND OF THE INVENTION

Thermoswitches of the above described type are well known and best shown in my prior U.S. Pat., No. 3,098,140, of July 16, 1963. In that patent, the switch arm is pivoted by one thermostatic probe and the microswitch is pivoted by a second thermostatic probe. It will be understood that using a second probe is costly and requires a relatively complicated assembly in the switch housing.

SUMMARY OF THE INVENTION

In this invention, a single elongated probe only is used, but it is arranged to pivot the switch arm in one angular direction with its tip and to pivot the microswitch in the opposite angular direction with a shoulder spaced rearwardly from the tip. An increased angular travel is thus achieved over conventional devices, with no increased travel of the probe rod, and the parts required are kept at a minimum.

BRIEF DESCRIPTION OF THE DRAWING

FIG. 1 is an end elevation, in section on line 1—1 of FIG. 2;
FIG. 2 is a side elevation of the invention shown in FIG. 1; and
FIG. 3 is an enlarged, fragmentary side elevation showing the pivot motion of the microswitch and lever arm diagrammatically.

DESCRIPTION OF PREFERRED EMBODIMENT

As shown in the drawing, 20 is the ultra sensitive thermostatic switch of the invention, for heating and cooling devices, which includes the housing 21, normally mounted to control air, liquids or solids, by sensing changes in temperature, and to control, by conductors 22 and 23, a heater, cooler, liquid tanks, or the like. Fixed to one wall of housing 21 by a suitable nut 24 is the outer high expanding tube 25 of a tubular thermostatic probe 26, of known, commercially available type, probe 26 having a solid low expanding rod 27 therein. Probe 26 projects from housing 20, to sense temperature and cause the tube 25 to expand or contract longitudinally, thereby causing rod 27 to actuate switch components within the chamber 28 of housing 21.

Rod 27 includes a free terminal rounded tip 30 and a shoulder 31, at a spaced distance rearwardly from the tip. Shoulder 31 may be formed by reducing the diameter of the rod, but preferably a one-piece cap 32 having an axial bore 33 is slid onto the rod end 34, the cap being of enlarged diameter but having the flat annular shelf, or shoulder, 31, from which the tip 30 of reduced diameter upstands.

The microswitch 35 includes the button 36 which opens and closes the circuit to conductors 22 and 23, and is supported between the parallel side walls 37 and 38 of an inverted U-shaped collar member 39 by transverse pins 42 and 43. The connecting wall, or bight, 44, of member 39 forms a collar encircling the rod tip 30, there being an aperture 45 therein for receiving tip 30. Preferably a pair of spaced-apart transverse bosses 46 and 47 are pressed into wall 44 in the underface 48 to serve as curved bearing faces on shoulder 31.

The pivot axis, or pin, 49, for microswitch collar member 39 is on the same side of rod 27 as the microswitch button 36, close to the level or plane of the top of the microswitch and close to the rod 27. Thus the shoulder 32 is near the pivot 49 to cause a short motion of the shoulder to produce a much larger angular motion of the button.

The button-actuating lever, or arm, 51, is pivoted to the housing on pivot, axis, or pin, 52, and includes a concaved depression, or dimple, 53, which receives the rounded terminal tip 30 of rod 27. The lever 51 is of U-shaped configuration with a postlike element 54 at the terminal end arranged to engage the button 36. A coil spring 55 encircles post 54 to urge the element toward the button 36 resiliently and yieldably, and a coil spring 56 is connected to U-shaped member 39 to urge the button 36 toward the element 54.

The pivot pin 52 is on the other side of rod 27 from pin 49 and is as close thereto as possible, so that short travel of tip 30 and dimple 53 relative to axis 52 will result in much larger arcuate travel of element 54. Element 54 extends through an aperture 58 in U-shaped lever 51, and preferably is threadedly adjustable therein, to vary the position of the tip thereof.

What is claimed is:

1. A thermostatic probe-type switch control of the type having a pivotally mounted microswitch with a button actuated by a pivotally mounted lever arm within a housing, said control being characterized by spaced-apart pivot pins in said housing, one pivotally supporting said switch and the other pivotally supporting said arm, the movable rod of said probe being located in the space between said pivots;

a rounded tip on said rod for pivoting said arm and a shoulder, spaced rearwardly from said tip on said rod, for simultaneously pivoting said microswitch, whereby a minute change of temperature sensed by said probe is sufficient to move said arm away from said button to actuate said switch.

2. A sensitive thermostat for quick reaction to change in environmental temperature, said thermostat comprising:

a housing adapted to be mounted in said environment;

a single probe-type, tubular thermostat having its outer tube fixed to, and projecting from, said housing, to sense ambient temperatures in said environment, and having the free terminal end of its inner rod extending into said housing, said inner rod having a rounded tip and having an enlarged shoulder at a spaced distance rearwardly from said tip;

a microswitch mounted within said housing, said switch having a collar element proximate one end encircling said inner end of said rod and abutting said shoulder, being pivotable proximate said collar end and having an actuating button proximate the other end; and a switch-button-actuating lever mounted within said housing, said lever having a dimple at one end receiving the rounded tip of said rod, being pivotable proximate said dimpled end and having an element at the other end engageable with said button, whereby movement of said rod further into said housing causes said shoulder to pivot said switch button away from said element, while simultaneously causing said rod tip to pivot said element away from said button to increase the effective motion of said rod.

3. A thermostat as specified in claim 2, wherein:

said collar element is of U-shaped configuration, said microswitch being supported between the parallel walls thereof, with said rod end extending through an aperture in the connecting wall thereof; and said actuating lever is also of U-shaped configuration with said element extending through an aperture in the connecting wall thereof.

4. A thermostat as specified in claim 2, wherein:

the pivot axis of said switch-button-actuating lever is on the opposite side of said rod end from the pivot axis of said microswitch.

5. A thermostat as specified in claim 2, plus:

a spring-pressed threadedly adjustable post, carrying said element at its free terminal end and extending through an aperture in said lever, whereby said element is resiliently and yieldably retractable away from said switch button.